(12) United States Patent
Strauss et al.

(10) Patent No.: US 10,857,709 B2
(45) Date of Patent: Dec. 8, 2020

(54) METHOD FOR PRODUCING MULTILAYERED ARTICLES IN AN INJECTION-MOLDING PROCESS

(71) Applicant: Kloeckner Desma Schuhmaschinen GmbH, Achim (DE)

(72) Inventors: Adrian Strauss, Visselhoevede (DE); Joachim Pfeiffer, Langwedel (DE)

(73) Assignee: KLOECKNER DESMA SCHUHMASCHINEN GMBH, Achim (DE)

( * ) Notice: Subject to any disclaimer, the term of this patent is extended or adjusted under 35 U.S.C. 154(b) by 210 days.

(21) Appl. No.: 15/580,773

(22) PCT Filed: Jun. 10, 2016

(86) PCT No.: PCT/EP2016/063259
§ 371 (c)(1),
(2) Date: Dec. 8, 2017

(87) PCT Pub. No.: WO2016/198574
PCT Pub. Date: Dec. 15, 2016

(65) Prior Publication Data
US 2018/0222098 A1    Aug. 9, 2018

(30) Foreign Application Priority Data

Jun. 10, 2015  (DE) .................. 10 2015 109 185
Sep. 29, 2015  (DE) .................. 10 2015 116 448

(51) Int. Cl.
*B29C 45/16* (2006.01)
*B29C 45/14* (2006.01)
(Continued)

(52) U.S. Cl.
CPC ........ *B29C 45/1671* (2013.01); *A43B 13/023* (2013.01); *A43B 13/04* (2013.01);
(Continued)

(58) Field of Classification Search
CPC ........... B29C 2045/14278; B29C 2045/14098; B29C 45/1671
(Continued)

(56) References Cited

U.S. PATENT DOCUMENTS 3,319,301 A * 5/1967 Ludwig ............... B29D 35/081
                                                            425/119
3,608,004 A * 9/1971 Borisuck ............. B29D 35/081
                                                            264/244
(Continued)

FOREIGN PATENT DOCUMENTS

DE     14 85 628 B1     1/1971
DE     17 29 141 B1     8/1971
(Continued)

OTHER PUBLICATIONS

International Search Report of PCT/EP2016/063259, dated Sep. 29, 2016.

*Primary Examiner* — Robert C Dye
*Assistant Examiner* — Alexander D Booth
(74) *Attorney, Agent, or Firm* — Collard & Roe, P.C.

(57) ABSTRACT

An injection-molding process for injecting a shoe soling including at least two adjacent injection-molding layers onto a shoe upper drawn over a shoe last, uses a mold cavity including a frame, the cavity being covered at the top by the upper also serving as a mold cover, with plastic material being injected into the cavity below the upper. To produce two adjacent injection-molding layers of plastic materials having different properties and reaction times in one operation, i.e. without needing an interim mold opening, before covering the cavity a film is clamped over it by a clamp mounted on the frame. When filling the cavity, the space below the film is first filled with plastic material to produce the first injection-molding layer and then, to produce the adjacent second injection-molding layer, the space above the film is filled with plastic material. Plastic materials are used that inseparably attach to the film.

8 Claims, 3 Drawing Sheets

(51) Int. Cl.
    *B29C 45/27*     (2006.01)
    *B29D 35/00*     (2010.01)
    *B29D 35/08*     (2010.01)
    *B29D 35/06*     (2010.01)
    *A43B 13/02*     (2006.01)
    *A43B 13/04*     (2006.01)
    *A43B 13/14*     (2006.01)
    *B29L 31/50*     (2006.01)

(52) U.S. Cl.
    CPC ........ *A43B 13/14* (2013.01); *B29C 45/14262* (2013.01); *B29C 45/1635* (2013.01); *B29C 45/2708* (2013.01); *B29D 35/0018* (2013.01); *B29D 35/061* (2013.01); *B29D 35/081* (2013.01); *B29C 45/14065* (2013.01); *B29C 45/14467* (2013.01); *B29C 45/14508* (2013.01); *B29L 2031/504* (2013.01)

(58) Field of Classification Search
    USPC ....................................................... 264/244
    See application file for complete search history.

(56) References Cited

U.S. PATENT DOCUMENTS

| | | | |
|---|---|---|---|
| 4,120,477 A * | 10/1978 | Justamante | B29D 35/081 249/109 |
| 4,716,662 A * | 1/1988 | Bar | A43B 7/28 12/146 B |
| 5,785,910 A * | 7/1998 | Sakashita | B29C 31/041 264/257 |
| 5,945,059 A * | 8/1999 | Atake | B29C 45/1418 264/510 |
| 7,682,549 B2 | 3/2010 | Lang et al. | |
| 7,767,127 B2 * | 8/2010 | Bramani | A43B 1/0027 264/244 |
| 2006/0225305 A1 * | 10/2006 | Morgan | A43B 1/0027 36/59 R |
| 2008/0229625 A1 * | 9/2008 | Frasson | B29C 45/0055 36/59 C |
| 2011/0047833 A1 * | 3/2011 | Tai | A43B 13/12 36/30 R |
| 2015/0016144 A1 | 1/2015 | Keist et al. | |

FOREIGN PATENT DOCUMENTS

| | | |
|---|---|---|
| DE | 20 20 335 A1 | 12/1971 |
| EP | 1 629 956 A1 | 3/2006 |
| EP | 2 103 420 A2 | 9/2009 |
| EP | 2 803 463 A1 | 11/2014 |
| GB | 1 092 136 A | 11/1967 |
| GB | 1 170 744 A | 11/1969 |

* cited by examiner

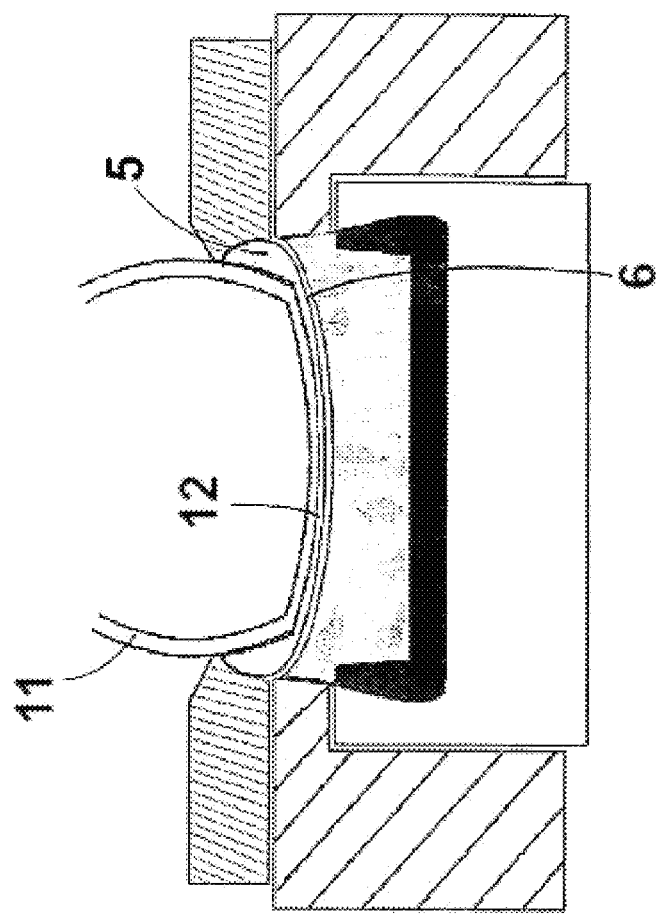

METHOD FOR PRODUCING MULTILAYERED ARTICLES IN AN INJECTION-MOLDING PROCESS

CROSS REFERENCE TO RELATED APPLICATIONS

This application is the National Stage of PCT/EP2016/063259 filed on Jun. 10, 2016, which claims priority under 35 U.S.C. § 119 of German Application Nos. 10 2015 109 185.2 filed on Jun. 10, 2015 and 10 2015 116 448.5 filed Sep. 29, 2015. The international application under PCT article 21(2) was not published in English.

BACKGROUND OF THE INVENTION

Field of the Invention

The invention relates to an injection molding process for injecting a shoe soling comprising at least two adjacent injection molding layers onto a shoe upper drawn over a shoe last, using a mold cavity comprising a frame, said cavity being covered at the top end by the shoe upper also serving as a mold cover, with plastic material being injected into the mold cavity below the shoe upper.

Description of the Related Art

An injection molding process of this type has been disclosed via EP 2 103 420 A2, for example. By means of this known method, the shoe upper used as a mold cover for the mold cavity has been provided in a preceding injection molding process with an injection molding layer serving as sole of the shoe upper, with an outsole having been inserted into the mold cavity, resulting in a three-layer shoe soling consisting of outsole, midsole and upper sole. However, at least two injection molding steps with an intermediate mold opening are required to produce this three-layer shoe soling.

For the manufacturer of shoes or shoe soling, optimized cycle times of the machines and injection equipment are of prime importance to achieve the largest possible number of items to be produced. However, if, to attain the desired physical or optical properties such as the strength or color of the material, for example, a shoe soling of two adjoining injection molding layers has to be produced, each injection molding layer increases the cycle time many times over because of the material used and the chemical reaction times that have to be observed between the individual injection processes in order to manufacture a shoe or shoe soling of good quality.

SUMMARY OF THE INVENTION

It is thus the objective of the present invention to further develop the injection molding method of the kind first mentioned above, in such a way that two adjacent injection molding layers of the shoe soling can be produced in a single operation, i.e. without an interim mold opening being required, from plastic materials having different properties and reaction times.

In order to achieve this objective, the invention proposed, based on the injection molding process of the kind first mentioned above, that prior to covering the mold cavity a film be clamped over the mold cavity by means of a clamping device mounted on the frame of the mold cavity and that, when filling the mold cavity, the space below the film is first filled with plastic material to produce the first injection molding layer and then, for the production of the adjacent second injection molding layer, the space above the film is filled with plastic material, wherein plastic materials being used that inseparably attach to the film.

In the method proposed by the invention, the film separates the adjacent molding layers during curing, resulting in the different reaction times of the plastic materials used to be irrelevant. On the other hand, the film connects the two adjacent injection molding layers inseparably with each other. As a result, the invention makes it possible to produce two adjacent injection molding layers, i.e. in the case of the embodiment example elucidated below, the midsole and the upper sole of a multilayer shoe soling can be produced in one operation, i.e. without having the mold to be opened intermittently.

In particular, in the case of the example of the method for manufacturing soles for shoes, one embodiment provides that the first layer underneath the film may be injected directly onto a layer that has already been injected or inserted into the cavity and that is activated, which in the specific case may be an outsole. The layer above is then the midsole and the layer injected above the film in this example is the upper sole, through which—as the name says—the complete sole package is connected to the shoe upper thus forming the finished shoe.

According to one embodiment, it is proposed that the same injection unit can be employed to inject the plastic materials into both the first and second injection ducts. The injection ducts are arranged vertically on top of each other and the injection unit can appropriately be moved vertically.

Alternatively, according to another embodiment, it may of course also be provided that two units arranged next to each other, which are rigidly aligned, are used for producing the respective layers.

Moreover, the invention also provides the use of a flow aid underneath the mold cover to keep the space for the production of the second injection molding layer open. During operation, this flow aid keeps the space above the film open, which is required for the production of the second injection molding layer, until this space is to be filled to produce the second injection molding layer.

Alternatively, for the creation of such a space and before filling the mold cavity, the invention provides that the mold cover is immersed by a short stroke into the mold cavity thereby tensioning the film downwards, following which the plastic material of the first injection molding layer is injected and attaches to the film, and afterwards by lifting the mold cover to its normal position, the space for injecting the plastic material of the adjacent second injection molding layer above the film is cleared.

In the case of one preferred embodiment, the clamping device includes two parts arranged on the frame, which are folded down to the top of the frame for clamping the film in place. For this purpose, the parts of the clamping device are attached directly to the respective lateral mold segment for manual closing and opening via a folding hinge.

Alternatively, in a different embodiment, the clamping device can include elements arranged on the cover part, which, in order to clamp the film in place, are lowered to the top of the frame together with the cover part when the mold cavity is closed.

BRIEF DESCRIPTION OF THE DRAWINGS

The present invention is elucidated in sufficient detail by way of the following figures, where

FIG. 3: is the cross-sectional view like in FIG. 2 but after the mold cover returns to an initial position.

DETAILED DESCRIPTION OF PREFERRED EMBODIMENTS

Figure 1:
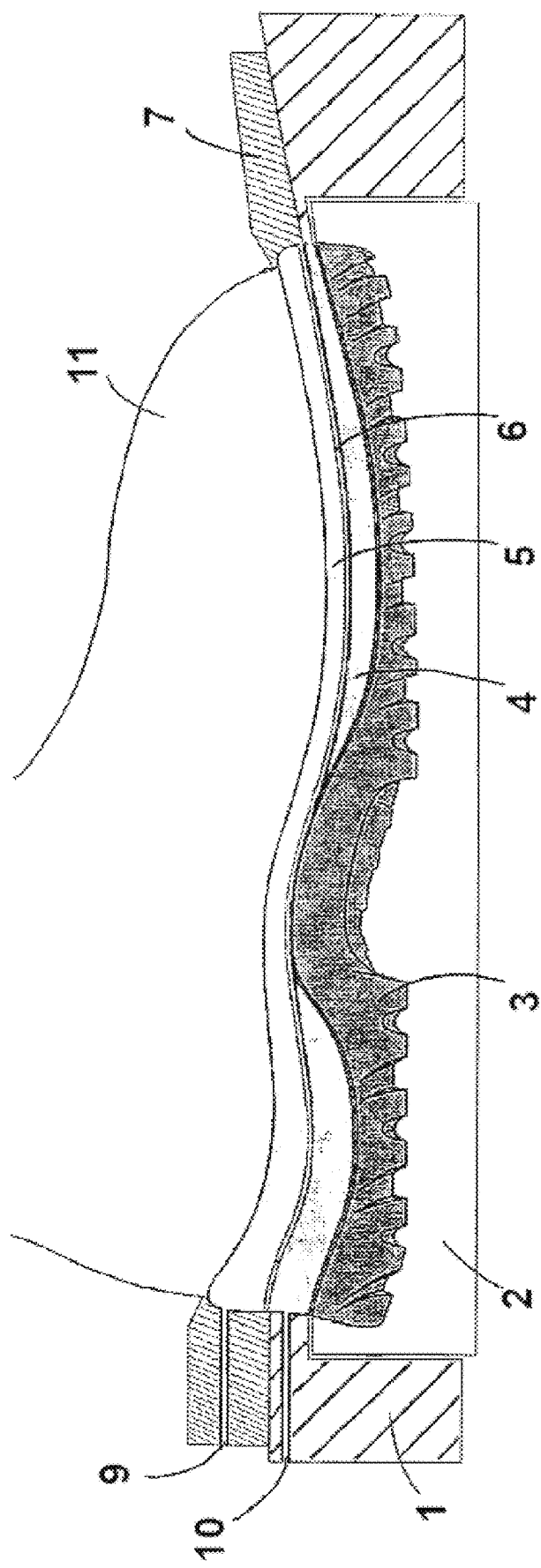
FIG. 1: is a longitudinal section of an injection mold on which a clamping device is mounted.

FIG. 1 shows an injection mold with a frame 1 consisting of two lateral mold segments, which are moved against each other to form a mold cavity, and a base die 2. The figure shows a three-layer buildup of a shoe soling, consisting of an outsole 3 with an activated surface previously placed into the mold cavity, a midsole 4 (first injection molding layer) and an upper sole 5 (second injection molding layer). A clamping device 7 is placed on the frame 1, holding a film 6 which is spanned above the mold cavity. The plastic material of the midsole 4 (first injection molding layer) is injected into the mold cavity via a lower injection duct 10 above the outsole 3 and below the film 6. The plastic material of the upper sole 5 (second injection molding layer) is injected into the mold cavity via an upper injection duct 9 above film 6 and below a mold cover 8, which is formed by a shoe upper 11 mounted on a last.

Figure 2:
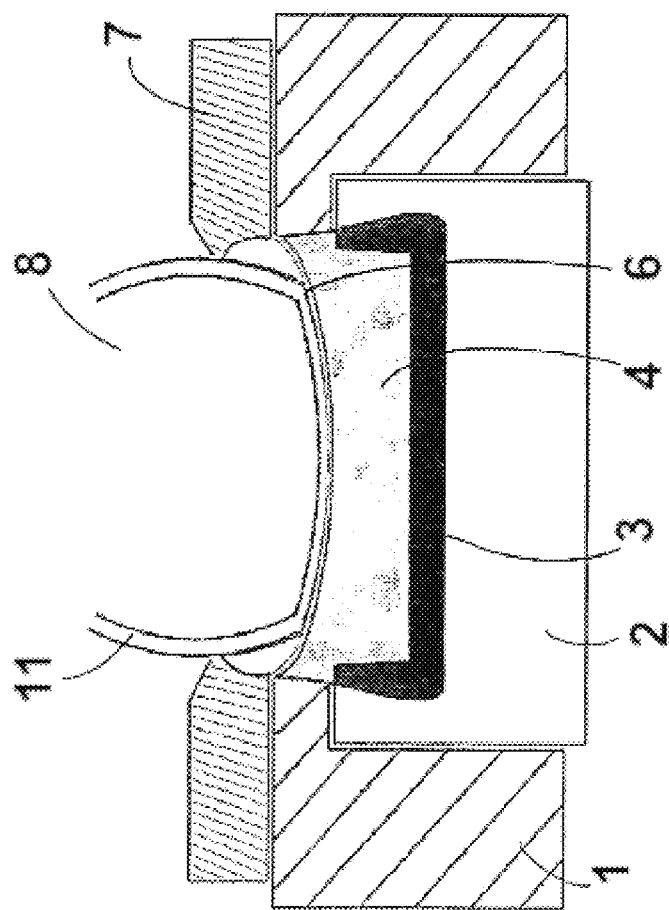
FIG. 2: is a cross-sectional view of an injection mold with mounted clamping device and with the mold cover having done a short downward stroke.

In FIG. 2 it is illustrated how the mold cover 8 carries out a short downward stroke in such a way that it is in lowered position between the lateral mold segments of frame 1 with clamping device 7 fitted. This causes the last 8 (i.e. the mold cover) covered with the shoe upper 11 to push down the film 6 to a slight extent. When the plastic material of the midsole 4 (first injection molding layer) is injected between the film 6 and the outsole 3, said film 6 adheres to the plastic material of midsole 4 (first injection molding layer), so that after raising the mold cover 8 by the amount of the short stroke into its initial position, space 12 is created between the mold cover 8 and film 6. The plastic material forming the upper sole 5 (second injection molding layer) is injected into the space 12 thus created above the film 6, said plastic material produces the bond between film 6 and the mold cover 8 (i.e. the shoe upper 11 drawn over the last).

The invention claimed is:

1. An injection molding method for injecting a shoe soling comprising at least two injection molding layers to a shoe upper mounted on a shoe last,
wherein plastic materials are introduced into a mold cavity comprising a frame, a base part, and a cover part, said mold cavity being covered at the top end by the shoe last such that the shoe last serves as the cover part, said mold cavity being below the shoe upper,
wherein prior to covering the mold cavity a film is stretched over the mold cavity by a clamping device mounted on the frame of the mold cavity,
wherein a space below the film is first injected with plastic material via a first injection duct to produce a first injection molding layer and then, for the production of a second injection molding layer, a space above the film is injected with plastic material via a second injection duct,
wherein the second injection molding layer is connected via the film to the first injection molding layer, and
wherein the plastic materials inseparably attach to the film.

2. The injection molding method according to claim 1, wherein the space for the production of the second injection molding layer remains open.

3. The injection molding method according to claim 1, wherein, before filling the mold cavity, the mold cover is immersed by a short stroke into the mold cavity thereby tensioning the film downwards, following which the plastic material of the first injection molding layer is injected and attaches to the film, and afterwards by raising the mold cover to a normal position, the space above the film is created for injecting the plastic material of the second injection molding layer.

4. The injection molding method according to claim 1, wherein the first injection molding layer is injected underneath the film directly onto an already-injected or inserted activated layer in the cavity.

5. The injection molding method according to claim 1, wherein a single injection unit adjustable in height is used to inject the plastic materials both into the first injection duct and into the second injection duct.

6. The injection molding method according to claim 1, wherein two rigidly aligned injection units arranged next to each other are used to inject the plastic materials into the first injection duct and into the second injection duct, respectively.

7. The injection molding method according to claim 1, wherein the clamping device comprises two parts arranged on the frame, said two parts being folded down onto a top of the frame to clamp the film in place.

8. The injection molding method according to claim 1, wherein the clamping device comprises elements arranged on an outside of the cover part, said elements being lowered onto a top of the frame together with the cover part, in order to clamp the film in place, when the mold cavity is closed.

* * * * *